United States Patent [19]

Sanderson et al.

[11] 4,455,229

[45] Jun. 19, 1984

[54] FULLY SHIELDED MULTIPLE CORE WATER CONDITIONER

[75] Inventors: Scott A. Sanderson; Eric F. Bruot, both of Fort Wayne, Ind.

[73] Assignee: Kemtune, Inc., Fort Wayne, Ind.

[21] Appl. No.: 509,980

[22] Filed: Jun. 30, 1983

Related U.S. Application Data

[63] Continuation of Ser. No. 400,452, Jul. 21, 1982, abandoned.

[51] Int. Cl.³ ............................................. B01D 35/06
[52] U.S. Cl. ..................................... 210/222; 55/100; 209/223 R
[58] Field of Search ....................... 210/695, 222, 223; 55/100; 209/223 R, 223 A

[56] References Cited

U.S. PATENT DOCUMENTS

| | | |
|---|---|---|
| 3,680,705 | 8/1972 | Happ . |
| 3,923,660 | 12/1975 | Kottmeier . |
| 3,951,807 | 4/1976 | Sanderson ............................ 210/222 |
| 4,050,426 | 9/1977 | Sanderson . |
| 4,146,479 | 3/1979 | Brown . |
| 4,176,065 | 11/1979 | Cook ................................... 210/223 |
| 4,289,621 | 9/1981 | O'Meara . |
| 4,320,003 | 3/1982 | Sanderson et al. ................. 210/222 |
| 4,357,237 | 11/1982 | Sanderson . |

Primary Examiner—Frank Sever
Attorney, Agent, or Firm—Jeffers, Irish & Hoffman

[57] ABSTRACT

A magnetic water conditioner having a plurality of permanent magnet cores therein wherein each of the cores is shielded by an individual collector sleeve so that the magnetic lines of force produced by the respective magnets are isolated from each other. This results in the lines of force intersecting the water flowing through the treatment chambers in a more radial direction so as to treat the water more effectively. The unit is easily disassemblable and is adapted to have a plurality of empty sleeves mounted therein so as to bypass around the magnets a portion of the water flowing through the device.

28 Claims, 9 Drawing Figures

FULLY SHIELDED MULTIPLE CORE WATER CONDITIONER

This is a continuation of application Ser. No. 400,452, filed July 21, 1982, abandoned.

BACKGROUND OF THE INVENTION

The present invention relates to a device for the magnetic treatment of liquids, and in particular for the treatment of water to reduce and prevent the buildup of scale in the pipes and vessels through which the water flows.

In systems and machinery which use large quantities of water, or in which water flows continuously, such as boilers, dishwashers, ice machines, cooling towers, and the like, scale is likely to build up on the surfaces which come into contact with the water. The severity of this problem depends on the mineral content of the water being used, but in most locations in the country and in other parts of the world, some action must be taken to either prevent or remove the buildup of scale on the equipment. Although the equipment can be treated with chemicals in order to remove the scale once it has formed, this procedure is quite expensive and requires continuous maintenance and the periodic shut down of the equipment for descaling. A preferred technique for solving the problem is to treat the water, either before it enters the system or as it is being circulated through the system, by means of a magnetic water conditioner of the general type to which the present invention relates.

Examples of such prior art magnetic treatment devices are disclosed in U.S. Pat. Nos. 3,951,807, 4,153,559, and 4,320,003, and also in copendng Pat. application Ser. No. 167,921 filed July 14, 1980. U.S. Pat. 4,050,426, relates to a device of somewhat similar structure which is utilized for the treatment of fuel in order to improve combustion efficiency and mileage. The disclosures of the aforementioned patents and application are incorporated herein by reference.

Basically, these prior art devices comprise an elongated bar magnet having a multiplicity of longitudinally spaced poles encased in a non-magnetic jacket and concentrically positioned within a casing made of magnetic material, such as galvanized or black iron. Appropriate fittings are connected to the ends of the magnetic casing so that the device can be connected in a water or fuel supply system, and the water or fuel flows through the annular treatment chamber defined between the radially spaced casings so that it is treated by the magnetic fields produced by the magnetic domains within the permanent magnet. The iron casing, since it is made of a ferromagnetic material, functions to short circuit the magnetic lines of force thereby confining the magnetic field to the annular treatment chamber.

Magnetic treatment devices generally of this type are well known and prevent corrosion and the buildup scale by causing the calcium and other minerals present in hard water to form, instead, a loose slurry which can be removed easily from the system by blow down or flushing. The effectiveness with which the water is treated depends on the intensity of the magnetic field within the treatment chamber and the effective length of the chamber itself. In order to effectively treat the water such that the minerals therein will not form as scale on the surfaces of the pipes and vessels, it is necessary that the water be subjected to a sufficient amount of magnetic flux as it passes through the conditioner. Since various installations, such as ice machines, boilers, vehicle cooling systems, etc., operate at widely varying pressures and flow rates, one size of water conditioner will not be sufficient for all applications. For example, the flow rate in a large boiler will be considerably higher than in a small ice making machine so that if the same size water conditioner normally used in the ice making machine were installed on the boiler, the drop in pressure and flow rate would be so great that proper operation of the boiler would not be possible. In order to properly size water conditioners to the particular installation, it has been necessary to develop a number of models over a wide range of flow capacities.

In installations which use all of the water supply without recirculating any of it, the water flows through the conditioner only once so that the water must be subjected to the optimum level of treatment during its cyclic pass through the conditioner. There are many systems, however, in which the water is constantly recirculated, such as in swimming pools, vehicle radiators, air conditioning cooling towers, and solar panels. In these installations, if the water conditioner is connected in series with the water recirculation system, the same water is repeatedly flowing through the water conditioner where it is again subjected to the magnetic field. It has been found, however, that once the water is subjected to the proper amount of magnetic flux, it will retain its scale avoiding properties for period of about 36 hours without retreatment. Accordingly, the constant retreating of the water in a recirculating system of this type is generally unnecessary. In the case of large flow capacity systems, such as in cooling systems of large truck and bus engines, large volumes of water are recirculated and at relatively low pressures. In order to effectively treat the water in a system of this type without resorting to a grossly oversized water condition, a bypass water conditioner of the type disclosed in the aforementioned U.S. Pat. No. 4,320,003, was developed. In such a bypass water conditioner, all of the recirculating water enters the device, but only a portion of it is diverted through the treatment chamber, with the remainder of the water flowing around it in a chamber which is shielded from the magnetic field of the treatment chamber. Although only a small portion of the water is treated during each pass through the unit, the treated portion of the water will become mixed with the untreated portion so that the net effect is full treatment of all of the water in the closed system after recirculation over an extended period of time.

Although a bypass water conditioner of the type disclosed in U.S. Pat. No. 4,320,003, has performed quite satisfactorily, it is sized for only a particular installation having a given flow rate and percentage of bypass. Basically, the magnetic core unit, which is the assemblage of the permanent magnet cores and ferrous shield, is a soldered unit so that it can be disassembled and reconfigured only with great difficulty. Thus, if a unit is constructed for a flow rate of 10 gallons per minute with a 25% treatment and 75% bypass, the user, if he determines that this treatment and insufficient for his particular installation, cannot readily alter the configuration of the water conditioner and must purchase a new unit having the flow capacity and bypass percentage that is desired. Also, if the user wishes to install the water conditioner in a non-recirculating system where 100% treatment of the water is desired, he must substitute a full treatment water conditioner for the bypass water conditioner because of the near impossibility of converting the unit from bypass to full treatment.

In areas where the water has a high iron content, if the user does not use an iron filter in advance of the water conditioner, iron particles may build up on the magnetic cores. After a period of time, the flow passages may become restricted and disassembly and cleaning of the unit may become necessary. With the prior soldered-type units, the user may not be capable of performing this maintenance, and the unit may have to be shipped back to the factory for disassembly, cleaning and reassembly. In larger capacity water conditioners, a single bar magnet may not be sufficient to produce the magnetic flux which is necessary to achieve proper treatment. Accordingly, larger prior art water conditioners comprise a plurality of permanent magnets encased within a sheath, of non-magnetic material and suspended within a single ferrous pipe, which defines the treatment chamber. In this type of unit, the water flows around each of the encased permanent magnets and is subjected to the lines of magnetic flux. It is a known phenomenon that the most effect treatment of the water is achieved by lines of force which intersect the flow of the water perpendicularly. In other words, the lines of magnetic flux which exit from and return to the magnet in a radial direction relative to the axis of the magnet are most effective for treating the water, whereas the lines of force which are more axial relative to the direction of flow, are less effective.

FIG. 8 illustrates, in a diagrammatic fashion, the lines of flux which are present between two magnet cores in a multiple-core water conditioner of the prior art type. It illustrates two bar magnets 10 and 12 having two magnetic domains with axially spaced North, South-South, and North poles. The magnets are encased within a ferrous sleeve 14, which serves to shield the magnets 10 and 12 from the environment and to collect the magnetic lines of force 16 which emanate from the magnet so as to conduct them back to the magnet in the shortest possible length. As can be seen, the magnetic lines of force 16 which are collected by the ferrous sleeve 14 are oriented generally radially relative to the direction of water flow indicated by arrow 18. The lines of flux 20 which extend toward the other magnet 10 or 12, however, are interfered with by the opposing lines of flux so that they tend to travel in an axial direction at approximately the center point between the two magnets 10 and 12. As discussed earlier, lines of flux which are oriented axially to the direction of water flow are much less effective in treating the water, and since the water flow is greater through the center of ferrous sleeve 14 due to friction produced by the inner wall, a considerable portion of the water traveling through the device is not treated in the most efficient manner. This necessitates utilizing a more powerful magnet 10 or 12 or increasing the length of the magnets 10 or 12 in order to produce the desired treatment.

SUMMARY OF THE INVENTION

The water conditioner according to the present application overcomes the just discussed problem of magnetic flux line distortion by encasing each magnet in its own ferrous sleeve so that the magnetic lines of force are collected and returned to the magnet along directions which have a much larger radial component than axial component. As illustrated in FIG. 9, magnets 10 and 12 are encased within their own ferrous sleeves 22, which in turn are encased within an outer casing 24.

The provision of a separate sleeve 22 for each magnet 10 and 12 causes the lines of force 26 to be collected and returned to the magnet along directions which are more radially oriented so that they intersect the water flowing through the device in the direction indicated by arrow 10 more perpendicularly to the direction of flow. This enables much more efficient treatment of the water given magnets 10 and 12 of a certain strength and length. Although individual water conditioners have been connected in parallel in water systems in the past, this was done by using a plurality of pipe joints to connect the water conditioners to the water line, or an elongate header was used. The difficulty with such an arrangement is that it was very difficult to determine what portion of the water was flowing through each unit without the use of gauges, and also, the units were quite expensive to install because each connection had to be water tight.

The water conditioner according to the present invention is intended primarily for larger flow rate installations wherein multiple magnetic cores are utilized. It comprises an outer casing having appropriate adapters for connection within a water line and a plurality of magnetic core units suspended within the outer casing so that they extend generally parallel to the direction of water flow through the outer casing. Each magnetic core unit comprises a ferromagnetic sleeve made of galvanized or black iron within which is suspended an elongate permanent magnet encased within a copper inner casing. The inner casing may be suspended by any appropriate means such that there is defined between it and the ferrous casing a generally annular treatment chamber through which the water flows. The ferrous sleeves are suspended in parallel fashion by means of two plate-like adapter flanges positioned at opposite ends of the core units and having a plurality of recesses therein which are dimensioned to receive the ends of the ferrous sleeves. The flanges are held together by means of a plurality of tie rods which extend between the flanges and have nuts or the like which can be tightened to draw the two flanges together thereby clamping the core units between them. This produces a rigid core assembly which is then slid within the outer casing and secured therein by an appropriate means, such as reducers connected to the ends of the center sleeve forming the outer casing.

Fluid communication between the annular treatment chambers and the inlet and outlet chambers within the outer casing located at the opposite ends of the core assembly is achieved by providing a plurality of openings through the flanges in the recessed areas that hold the ferrous sleeves. Thus, the water flows into the inlet chamber of the outer casing, through the openings and into the treatment chambers of the magnetic core units where it is subjected to the magnetic fields and then out through the outlet chamber and back into the water supply system or apparatus which is using the treated water.

The water conditioner of the present invention can be converted to a bypass conditioner simply by substituting empty sleeves, made of a ferrous or non-ferrous material, for some of the magnetic core units. Thus, a portion of the water will flow through the magnetic core units where it is treated by the magnetic fields, but the remainder will flow through the empty sleeves and not be treated, but will be mixed with the treated water in the outlet chamber at the other end of the core assembly. For example, if a water conditioner has twelve recesses in each of the spacer flanges, it is capable of accomodating up to twelve magnetic core units. By occupying nine of the spaces with empty sleeves and the three center spaces with sleeves containing magnetic cores, a bypass water conditioner results wherein up to 25% of the water will be treated by the center magnetic core units and the remainder of the water will be bypassed through the empty sleeves. Of course, the percentage of water which is treated will depend on the flow restrictions in the magnetic core units as compared to the empty sleeves. This arrangement is quite advantageous in that it enables the unit to be converted from a bypass water conditioner to a full treatment water conditioner or even to change the percentage of bypass simply by substituting magnetic core units for empty sleeves.

A further advantage to the water conditioner of the present invention is the ease with which it can be disassembled and reassembled for purposes of cleaning or reconfiguring the core assembly. The core units comprise a permanent magnet encased within an inner casing made of copper having end portions which are tubular and include apertures through their side walls just beyond the ends of the magnet. A reducer coupling is fixedly secured to one end, such as by soldering, and this coupling is flared so that it has an outer diameter larger than the inner diameter of the ferrous sleeve. The reducer coupling on the other end is slidably received over the inner casing and also has the same dimensional relationship with the ferrous sleeve. The inner casing is slid within the ferrous sleeve until the reducer coupling abuts the end of the sleeve, and the other reducer coupling is inserted over the opposite end of the inner casing so as to locate the inner casing within the sleeve. When this unit is then clamped between the two spacer flanges, the inner casing is prevented from sliding out of the ferrous sleeve by the flanges and, because the reducer couplings have an outer diameter which is larger than the inner diameter of the sleeve, the entire unit is rigidly held together. With the tie rods connected between the to spacer flanges, the entire core assembly is then slid within the outer casing and is axially located in the axial direction by the reducers that are connected to the opposite ends of the outer casing center sleeve. In a preferred embodiment of the invention, the reducers for the outer casing form shoulders which abut against the spacer flanges to hold it in place. The outer diameter of the flanges is just slightly less than the inner diameter of the center portion of the outer casing so that a rigid assembly results. Because of the absense of soldered connections, the unit can be easily disassembled for cleaning and the substitution of empty sleeves for magnetic core units or visa versa. This can be accomplished in the field without the necessity for returning the unit to the factory.

The water conditioner according to the present invention comprises a hollow outer casing having an inlet on one end and an axially spaced outlet with the casing being adapted to be connected in a water line. A plurality of elongate permanent magnet core units are received in the outer casing with each core unit comprising a magnetic field producing permanent magnet encased within an inner casing of non-magnetic material, a collector sleeve of magnetic material disposed around the inner casing and permanent magnet, and means for spacing radially the sleeve and inner casing to form a generally annular treatment chamber therebetween. The sleeves function to shield each permanent magnet from the others and collect the magnetic lines of force produced by the permanent magnets. The permanent magnet core units are suspended within the outer casing such that they are generally parallel to each other and to the axis of the outer casing, and an inlet chamber is defined within the outer casing intermediate the casing inlet and the permanent magnet core units. An inlet manifold diverts at least a portion of the water entering the inlet chamber into the permanent core treatment chambers through their respective inlets whereby the diverted water flows through the treatment chamber wherein it is subjected to the magnetic fields and then flows out of the casing outlet.

In a bypass configuration, a plurality, less than all, of the sleeves have permanent magnet cores mounted therein and the sleeves within which the cores are mounted are made of a magnetic material to thereby shield each permanent magnet from the others and to collect the magnetic lines of force produced by the magnets. The manifold diverts a portion of the water entering the inlet chamber from the outer casing into the sleeves containing the permanent magnet cores and diverts the remaining water into the sleeves which do not contain the cores whereby only a portion of the water is treated by the magnetic fields.

It is an object of the present invention to provide a water conditioner having a plurality of magnetic cores contained within a housing wherein each of the permanent magnet units is magnetically shielded from the others so that the magnetic lines of force intersect the water flowing through the treatment chambers in a more radial direction than in prior art units of this type.

It is a further object of the present invention to provide a magnetic water conditioners which is capable of being easily disassembled in the field for maintenance without the necessity for breaking soldered joints or utilizing specialized equipment.

A still further object of the present invention is to provide a magnetic water conditioner having a plurality of cores which are interchangable with each other such that empty core units can be interchanged with permanent magnet core units to thereby vary the percentage of bypass These and other objects and advantages of the present invention will become more apparent from the description of a preferred embodiment of the invention considered together with the appropriate drawing figures.

DETAILED DESCRIPTION

Figure 1:
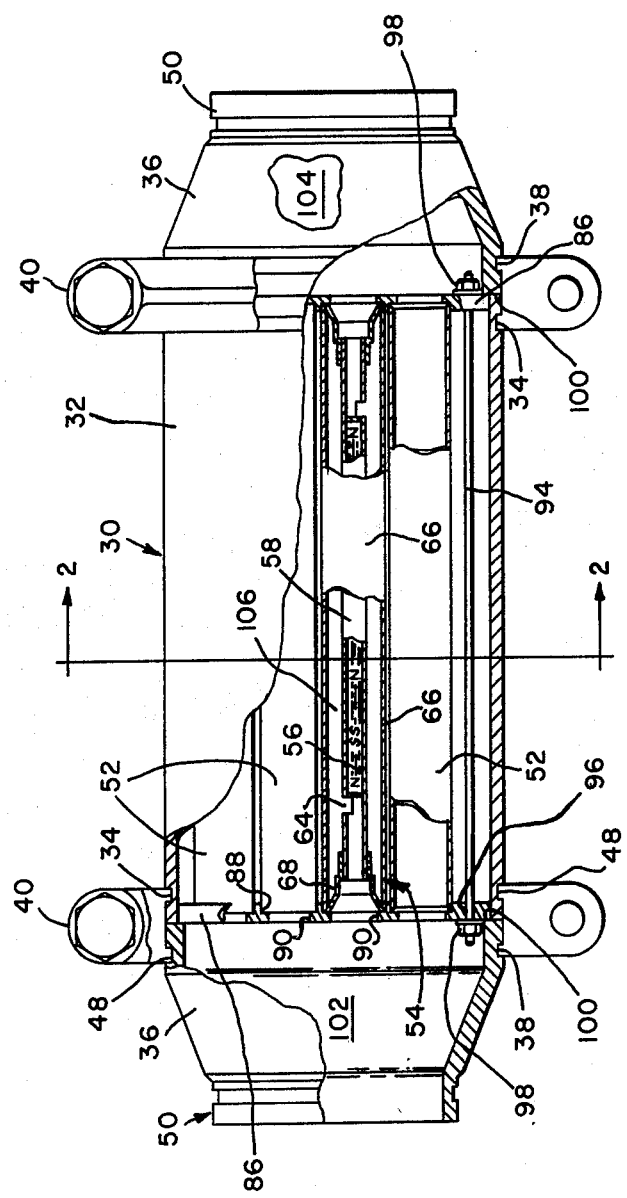
FIG. 1 is an elevational view, partially in section, of an embodiment of the present invention.
Figure 2:
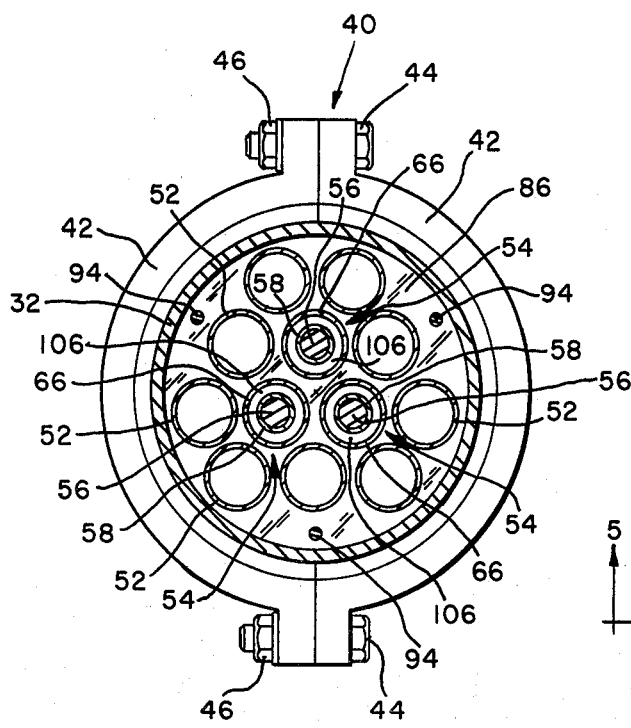
FIG. 2 is a sectional view taken along line 2—2 of FIG. 1 and viewed in the direction of the arrows.
Figure 4:
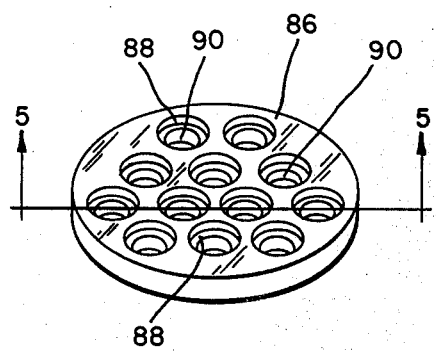
FIG. 4 is a perspective view of one of the spacer flanges.
Figure 3:
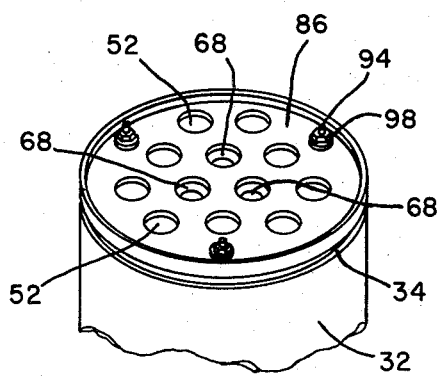
FIG. 3 is a perspective view of one end of the water conditioner with the reducer removed.
Figure 5:
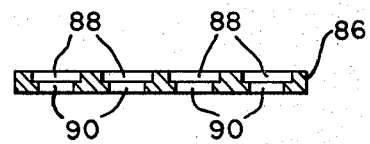
FIG. 5 is a sectional view taken along line 5—5 and viewed in the direction of the arrows.
Figure 8:
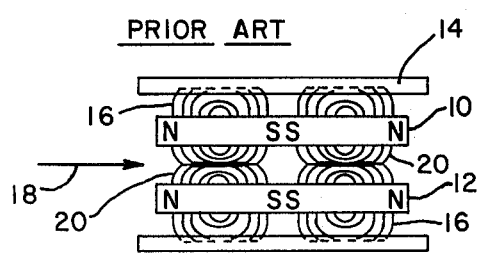
FIG. 8 is a diagrammatic view showing the flux lines in a prior art water conditioner.

Referring now to the drawings, and in particular to FIGS. 1 through 6, an embodiment of the present invention wherein 25% of the sleeves contain a permanent magnet core is illustrated. The outer casing 30 comprises a tubular and cylindrical center sleeve portion 32 made of galvanized iron and having a pair of circumferential grooves 34 formed therein. Connected to center sleeve portion 32 are a pair of Victaluic grooved reducers 36 having grooves 38 therein and connected to center sleeve portion 32 by means of couplers 40. Couplers 40, as illustrated in FIG. 2, comprise two halves 42 which are clamped together by means of bolts 44 and nuts 46 around center sleeve protion 32 and reducers 36. Circular ridges 48 on couplers 40 engage grooves 34 and 38 so as to lock couplers 36 to center sleeve portion 32. As is customary with this type of connection, gaskets (not shown) may be compressed between couplers 36 and center sleeve portion 32 in order to make the outer casing 30 water tight. The ends 50 of couplers 36 are also grooved and adapted to be connected to a water line by a pair of couplers similar to couplers 40.

Suspended within outer casing 30 are nine empty sleeves 52 and three permanent magnet core units 54, wherein the core units 54 are clustered near the center of casing 30 and the empty sleeves 52 disposed around them. Of course, this is only an example of a possible configuration, and the ratio of permanent magnet core units 54 to empty sleeves 52 will depend upon the amount of bypass which is desired, and the configuration of the magnet core units in relationship to the empty sleeves 52 can also be changed.

Figure 6:
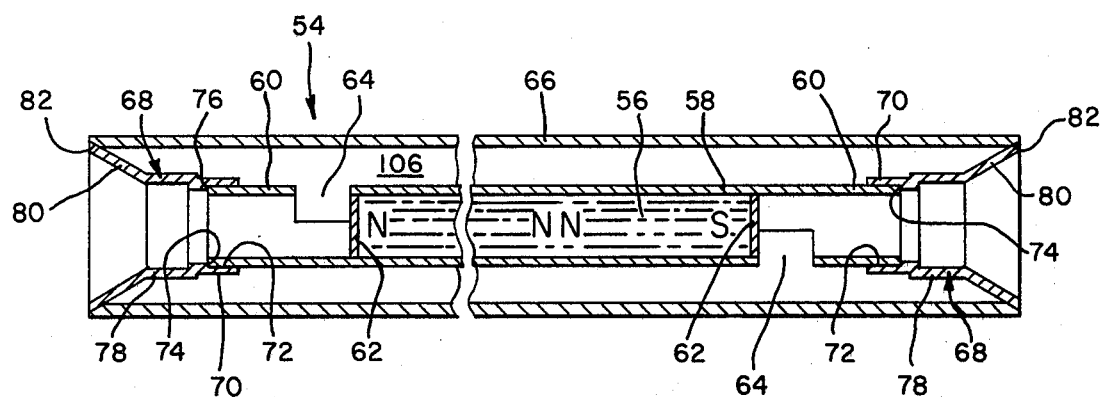
FIG. 6 is an enlarged sectional view of one of the magnetic core units.

One of the permanent magnet core units 54 is illustrated in detail in FIG. 6 and will be seen to comprise a permanent magnet 56, such as an ALNICO magnet, magnetized along its longitudinal axis to have a plurality of longitudinally spaced apart poles of alternate North and South polarity represented by the symbols "N" and "S". In the particular embodiment illustrated, there are four magnetic domains. Magnet 56 is substantially homogeneous in composition and is generally of the type utilized in the water conditioners disclosed in the prior art patents discussed earlier.

Magnet 56 is encased within an inner casing 58 having tubular end portions 60 extending beyond the ends of magnet 56. Magnet 56 is sealed within inner casing 58 by a pair of brass plugs 62 that are soldered in place, and inner casing 60 has a pair of openings 64 cut in the end portions 60 thereof and offset 180° from each other about the longitudinal axis. As mentioned earlier, inner casing 58 is preferably made of copper, although other types of non-magnetic material such as brass, could be used. For purposes of the present application, the term "non-magnetic" means materials having a very low magnetic permeability and virtually no ferromagnetic characteristics such as copper, brass, PVC and nylon, for example. "Magnetic" materials are those materials exhibiting high magnetic permeability, such as iron and certain steels and other ferromagnetic materials.

Figure 9:
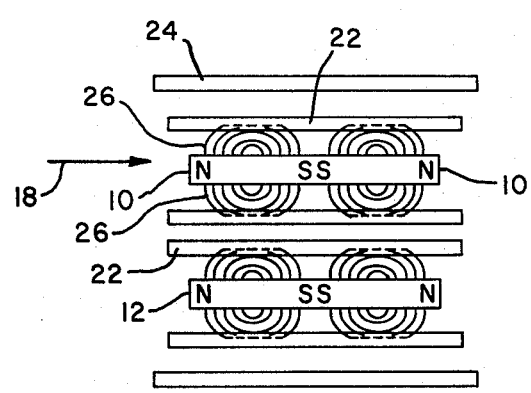
FIG. 9 is a diagrammatic view showing the flux lines in a water conditioner according to the present invention.

The magnetic core 54 is coaxially received within a tubular, cylindrical intermediate casing 66 of a magnetic material having a high magnetic permeability, such as a TEFLON coated galvanized pipe. Casing or sleeve 66, because of its magnetic characteristics, functions as a collector sleeve in that it collects the lines of flux produced by magnet 56 and completes the magnetic circuit so that the lines of flux return to magnet 56 over the shortest possible path. This results in the lines of flux having a large radial component, as illustrated in FIG. 9.

Inner casing 56 is centered within sleeve 66 by means of flared copper reducers 68 connected to tubular end portions 60. Each of the reducers 68 comprises a first portion 70 having an inner surface 72 the same size as the outer diameter of tubular end portion 60 and including a shoulder 74 which is in abutment with the end 76 of inner casing 58. Integral with intermediate portion 78 is a flared outer portion 80 which, as is illustrated in FIG. 6, has an outer diameter larger than the inner diameter of sleeve 66. The ends 82 of sleeve 66 are chamfered at the same angle as the flared portion 80 of reducers 68 so that the reducers 68 nest within sleeve 66 and do not protrude beyond the ends thereof. One of the reducers 68 is soldered to inner casing 58 and the other reducer 68 is slidably recieved thereon so that the core unit 54 can be easily disassembled simply by sliding off the reducer 68 which is not soldered and then separating the sleeve 66 and the reducer 80-inner casing 58 assembly.

The empty sleeves 52 are perferably made of the same material as sleeves 66 of permanent magnet core units 54 so that they can be converted to permanent magnet core units simply by inserting a permanent magnet core comprising magnet 56, inner cassing 58 and reducers 68. If the sleeves 52 are empty, however, they are not required to perform any shielding function so that they could be made of a non-magnetic material, such as copper or PVC. In order to afford interchangability between empty sleeves 52 and core units 54, it is desirable that at least the end portions of sleeves 52 and sleeves 66 be similarly dimensioned.

Sleeves 52 and core units 54 are suspended within outer casing 30 by a pair of spacer flanges 86 (FIGS. 4 and 5) that are made of TEFLON coated steel and comprise a plurality of recesses 88 therein having openings 90 extending therethough in approximately the center of the recesses 88. Recesses 88 are approximately the same size as sleeves 52 and 66 and receive the ends thereof so as to suspend empty sleeves 52 and core units 54 within outer casing 30 in parallel fashion as illustrated in FIG. 1. Flanges 86 are clamped together by means of three tie rods 94 extending through openings 96 in flanges 86 and clamped thereon by means of nuts 98. When core units 54 are clamped between spacer plates 86, the reducers 68 (FIG. 6) are clamped against the ends of sleeves 66 so as to form a rigid core assembly that is then inserted with an outer casing 30. As illustrated in FIG. 1, reducers 36 have a smaller inner diameter than does the center sleeve portion 30 thereby forming a pair of shoulders 100 that abut plates 86 so as to locate the core assembly within outer casing 30.

As can be seen, the entire unit is capable of being easily disassembled simply by removing one of the couplers 40 and its associated reducer 36, sliding the core assembly comprising the empty sleeves 52, permanent magnet core units 54 and spacer plates 86 out of outer casing 30, removing one set of nuts 98 to remove one of the spacer plates 86, and removing one or more of the empty sleeves 52 and one or more of the permanent magnet core units 54. The inner casing 58 of a core unit 54 can be removed by removing the loosely connected reducer 68 and sliding the rest of the unit out of sleeve 66.

An empty sleeve 52 can be substituted for a permanent magnet core unit 54 at any location within outer casing 30 where there are a pair of axially aligned recesses 88 in plates 86, and the same can be done with respect to any of the core units 54. If the empty sleeves 52 are made of a magnetic material, they can be converted from an empty core to a permanent magnet core by inserting an inner casing 58 and reducer 68 assembly and then reassembling the spacer flanges 86. For example, the 25% bypass unit illustrated in FIG. 2 could be converted to a 100% treatment unit illustrated in FIG. 7 by either substituting permanent magnet core units 54 for the empty sleeves 52 or, if the empty sleeves 52 are magnetic sleeves similar to sleeves 66, simply by inserting permanent magnet cores of the type illustrated in FIG. 6 therein.

Figure 7:
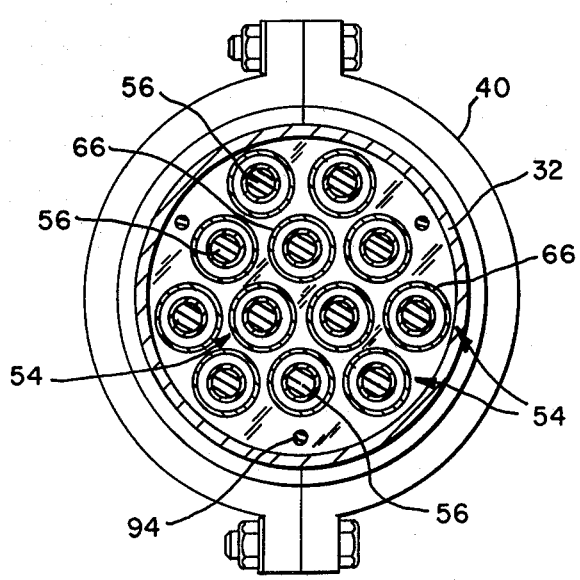
FIG. 7 is a longitudinal view similar to FIG. 2 wherein all of the sleeves contain permanent magnet cores.

In operation, the water, or other liquid, to be treated flows into the inlet chamber 102 defined within the left-hand reducer 36 illustrated in FIG. 1, and spacer flange 86 functions as an inlet manifold to divert a portion of the water through magnetic core units 54 and the remainder of the water through empty sleeves 52. The water flowing through sleeves 52, which is not treated, flows into outlet chamber 104 in the other reducer 36 where it will be mixed with the treated water. The water flowing through the permanent magnet core units 54 flows through openings 90 into reducers 68 which are connected to the tubular end portions 60 of inner casing 58. From there, the water flows through one of the apertures 64 into the annular treatment chamber 106 defined between inner casing 58 and sleeve 66. The water is subjected to the magnetic field produced by magnet 56 and then flows out through the other aperture 68 into reducer 68 and then into outlet chamber 104 where it is mixed with the untreated water. In the embodiment of FIG. 7, all of the water flows through the annular treatment chambers 106 thereby resulting in 100% treatment.

Since outer casing 30 is fluid-tight, it is not necessary that the plates 86 and sleeves 52 and 66 be fluid-tight, thereby greatly reducing the cost of assembly by avoiding the necessity for soldering or threaded connection. Empty sleeves 52 perform an important function, however, in that they preserve the laminar flow of the water passing through the unit so as to avoid aeration, which can result in oxidation within the unit. Empty sleeves 52 could have their center portions reduced in diameter or restricters placed therein, or could even be completely blocked if it is desired to adjust the percentage of water which is treated. It is desirable, however, for the end portions of sleeves 52 be to dimensioned similarly to sleeves 66 so that they can be fully interchangeable in the recesses 88 of spacer plates 86.

By way of example, in the embodiment illustrated in the drawings, center sleeve portion 32 is an eight inch by eighteen inch galvanized pipe, reducers 36 are eight inch by five inch Victaulic grooved reducers, and sleeves 52 and 66 are TEFLON coated one and one-half inch by seventeen inch galvanized pipes. Spacer flanges 86 are eight inches in diameter by one inch thick steel plates, preferably TEFLON coated, and openings 90 are one and one-half inches in diameter. Recesse 88 are one and fifteen-sixths inches in diameter so as to be slightly larger than the outer diameters of sleeves 52 and 66. Inner casing 58 is one inch in diamter and fourteen and one-half inches long and made of type L copper tubing, and contains a one inch by eight inch cobalt magnet. Reducers 68 are one and one quarter inches by one inch and flared, and openings 64 are cut approximately one-half way through inner casing 58 such that their cross-sectional areas are equal to approximately the internal cross-sectional area of pipe 58.

While this invention has been described as having a preferred design, it will be understood that it is capable of further modification. This application, is, therefore, intended to cover any variations, uses, or adaptations of the invention following the general principles thereof and including such departures from the present disclosure as come within known or customary practice in the art to which the invention pertains and fall within the limits of the appended claims.

What is claimed is:

1. A water conditioner comprising:

a hollow outer casing having an inlet on one end and an axially spaced outlet, said casing being adapted to be connected in a water line;

a plurality of elongate permanent magnet core units received in said outer casing, each said core unit comprising: a magnetic field producing permanent magnet encased within an inner casing of non-magnetic material, chamber means for providing a flow path for water longitudinally along said encased magnet, said chamber means including magnetic sleeve means for shielding each permanent magnet from the others and collecting the lines of magnetic force produced by the magnet to maximize the lines of force that intersect perpendicularly to the direction of flow of the water flowing through the chamber means, said collector means comprising a collector sleeve of magnetic material disposed around said inner casing and permanent magnet, and means for spacing radially said sleeve and inner casing to form a generally annular treatment chamber therebetween, said treatment chamber having an inlet and an outlet;

said permanent magnet core units being suspended within said outer casing such that they are in close proximity to each other and are generally parallel to each other and to the axis of the outer casing;

an inlet chamber within said outer casing intermediate said casing inlet and said permanent core units; and inlet manifold means within said outer casing for diverting at least a portion of the water entering said inlet chamber from the casing inlet into the permanent magnet core treatment chambers through their respective inlets;

whereby the diverted water flows through the treatment chambers wherein it is subjected to the magnetic fields and then flows out of the outer casing outlet.

2. The water conditioner of claim 1 including a plurality of individually removable empty tubular sleeves suspended within said outer casing by said manifold means generally parallel to said permanent core units, and said manifold means includes means for diverting a portion of the water entering the inlet chamber from said outer casing inlet through said empty sleeves, whereby only part of the water flowing through the conditioner is subjected to a magnetic field.

3. The water conditioner of claim 1 wherein said manifold means diverse all of the water entering said inlet chamber through said permanent magnet core units.

4. The water conditioner of claim 1 wherein said means for spacing radially comprises a plurality of reducer couplings connected to each end of the respective inner casings, each said reducer coupling comprises a smaller diameter end connected to the respective inner casing and a larger diameter end seated against an inner surface of the respective collector sleeve.

5. The water conditioner of claim 4 wherein: said collector sleeves are tubular and cylindrical, and said reducer coupling larger diameter ends are larger in diameter than the inner diameter of said sleeves, whereby said inner casings are axially located by said collector sleeves.

6. The water conditioner of claim 5 wherein the reducer coupling connected to one end of the respective inner casing is fixedly attached thereto, and the reducer coupling connected to the opposite end of the respective inner casing is slidable thereon so as to permit easy disassembly of the respective sleeve and inner casing, and including means for axially clamping the respective collector sleeve, inner casing and reducer couplings together.

7. The water conditioner of claim 5 wherein the reducer coupling connected to one end of the respective inner casing is fixedly attached thereto, and the reducer coupling connected to the opposite end of the respective inner casing is slidable thereon so as to permit easy disassembly of the respective sleeve and inner casing, and including a second manifold means at the opposite ends of said permanent magnet core units for conveying the water from the treatment chambers into an outlet chamber in said outer casing, and including means for clamping said manifold means against the ends of said sleeves to hold together said inner casings, reducer couplings and sleeves.

8. The water conditioner of claim 7 wherein said manifold means each includes recessed openings in which the ends of said sleeves are seated, said openings providing fluid communication from said treatment chamber to said inlet and outlet chambers.

9. The water conditioner of claim 8 wherein said manifold means are apertured plates clamped together by tie rods.

10. The water conditioner of claim 1 including outlet manifold means for diverting water from the core unit treatment chambers into the outlet chamber in said outer casing, each of said manifold means comprising a plate having a plurality of recessed openings extending therethrough, and the ends of said sleeves being supported in the recesses associated with the respective openings.

11. The water conditioner of claim 10 including a plurality of tie rod means for connecting said plates together and clamping said sleeves therebetween.

12. The water conditioner of claim 10 including a shoulder at each end of said outer casing axially locating the plates and core units within said outer casing.

13. The water conditioner of claim 12 wherein said outer casing comprises a tubular center sleeve and a reducer connected to each end of said center sleeve, said reducers having inner diameters that are smaller than the inner diameter of said center sleeve thereby forming said shoulders that locate said plates.

14. A water conditioner comprising:
a hollow outer casing having an inlet on one end and an axially spaced outlet on the other end thereof, said casing being adapted to be connected in a water line;
a plurality of elongate tubular sleeves received within said outer casing for providing flow paths for water in a longitudinal direction, said sleeves being suspended in said outer casing such that they are generally parallel to the axis of the outer casing,
a plurality, less than all, of said sleeves having respective permanent magnet cores mounted therein, each of said cores comprising: a magnetic field producing permanent magnet encased within an inner casing of non-magnetic material, and means for spacing radially the respective sleeve and inner casing to form a generally annular treatment chamber therebetween, said treatment chamber having an inlet and an outlet;
said sleeves in which said cores are mounted being made of a magnetic means for shielding each permanent magnet from the others and collecting the magnetic lines of force produced by the permanent magnets to maximize the lines of force that intersect water flowing through the sleeves having permanent magnet cores therein perpendicular to the direction of flow;
said outer casing comprising an inlet chamber intermediate said outer casing inlet and said sleeves, and an outlet chamber intermediate the sleeves and the outer casing outlet; and
manifold means for diverting a portion of the water entering said inlet chamber from the outer casing inlet into the sleeves containing said permanent magnet cores and for diverting the remaining water entering the inlet chamber into the sleeves which do not contain permanent magnet cores, the water diverted into the sleeves containing cores flowing through the core treatment chambers wherein it is subjected to the magnetic fields and then flows into the outlet chamber, and the water diverted into the sleeves not containing cores flowing therethrough without treatment and then into the outlet chamber where it is mixed with the treated water.

15. The water conditioner of claim 14 wherein there are twelve said sleeves and 25% of the sleeves contain permanent magnet cores.

16. The water conditioner of claim 14 wherein said outer casing is cylindrical and tubular and said outer casing inlet and outlet are axially aligned along the axis of said outer casing.

17. The water conditioner of claim 16 wherein the sleeves containing cores are clustered at the radial center portion of the outer casing and the sleeves not containing cores are located around the periphery of the clustered sleeves.

18. The water conditioner of claim 14 wherein said manifold means comprises two plates seated within said outer casing at the opposite ends of said sleeve and each comprises a plurality of recesses in which the ends of said sleeves are seated and openings in each recess providing fluid communication between the inlet and outlet chamber and said sleeves.

19. The water conditioner of claim 18 wherein all of said sleeves are substantially identical in shape and size so as to be interchangeable with each other.

20. The water conditioner of claim 18 wherein said sleeves include ends that all have substantially the same outer diameters so that the positions of the sleeves are interchangeable with each other in the recesses of said plates.

21. The water conditioner of claim 18 including tie rod means for drawing together said plates to clamp said sleeves therebetween.

22. A water conditioner comprising:

an elongate hollow outer casing having an inlet on one end and an outlet on the other end and adapted to be connected in a water line;

said outer casing including a detachable fluid fitting on one end thereof;

a plurality of elongate permanent magnet core units received in said outer casing, each said core unit comprising: a magnetic field producing permanent magnet encased within an inner casing of non-magnetic material, chamber means for providing a flow path for water longitudinally along said encased magnet, said chamber means including magnetic sleeve means for shielding each permanent magnet from the others and collecting the lines of magnetic force produced by the magnet to maximize the lines of force that intersect perpendicularly to the direction of flow of the water flowing through the chamber means, said collector means comprising a collector sleeve of magnetic material disposed around said inner casing, and means for spacing radially said sleeve and inner casing to form an annular treatment chamber therebetween, said treatment chamber being in fluid communication with the ends of the respective sleeve, and said inner casing being axially removable from said collector sleeve;

a pair of parallel, axially spaced apart manifold plates facing each other and each having a plurality of recesses in one face thereof, the recesses of one plate facing and being axially aligned with the recesses of the other plate;

the ends of said sleeves being received in said recesses such that said sleeves are suspended within said outer casing generally parallel to the axis of said outer casing, said manifold plates retaining said inner casings within the respective collector sleeves; and means releasably for drawing said plates together so as to clamp said sleeves between them and form a rigid core assembly;

said core assembly being slidable out of said outer casing when said fluid fitting is removed;

a plurality of openings through each of said plates within said recesses to connect the interiors of said sleeves to the inlet and outlet of said outer casing such that there is fluid communication between the interiors of the sleeves and the inlets and outlets of the outer casing.

23. The water conditioner of claim 22 wherein said means for spacing radially comprises a reducer coupling connected to each end of the respective inner casing, each said reducer coupling comprises a smaller diameter end connected to the respective inner casing and a larger diameter end seated against an inner surface of the respective collector sleeve.

24. The water conditioner of claim 23 wherein: said collector sleeves are tubular and cylindrical, and said reducer coupling larger diameter end are larger in diameter than the inner diameter of said sleeves, whereby said inner casings are axially located by said collector sleeves.

25. The water conditioner of claim 24 wherein the reducer coupling connected to one end of the respective inner casing is fixedly attached thereto and the reducer coupling connected to the opposite end of the respective inner casing is slidable thereon, and said plates hold the respective reducer couplings within said sleeves when they are drawn together, whereby said inner casings and reducer couplings can be easily removed from said sleeves when said plates are removed.

26. The water conditioner of claim 22 including a pair of stops within said outer casing for axially locating said core assembly when said fluid fitting is in place on said outer casing.

27. The water conditioner of claim 22 including a plurality of empty bypass sleeves suspended between aligned pairs of said recesses and in fluid communication with the outer casing inlet and outlet to bypass water around said core units.

28. The water conditioner of claim 22 wherein said means for drawing comprises a plurality of tie rods connected to and extending between said plates.

* * * * *